Figure 1:
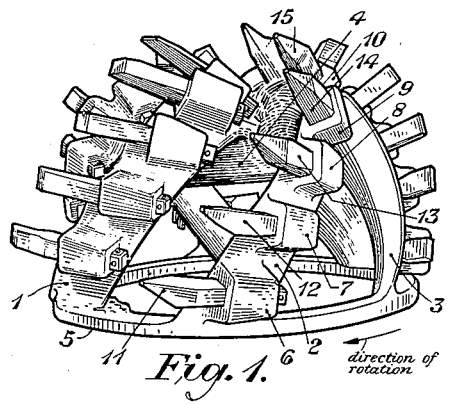

March 4, 1941.  L. T. GAYLORD  2,233,943
CUTTER FOR DREDGES
Filed Feb. 3, 1939

INVENTOR
L. T. Gaylord
BY
ATTORNEY

Patented Mar. 4, 1941

2,233,943

UNITED STATES PATENT OFFICE 2,233,943

CUTTER FOR DREDGES

Laurence T. Gaylord, Upper Montclair, N. J., assignor to Atlantic, Gulf and Pacific Company, a corporation of West Virginia Application February 3, 1939, Serial No. 254,343

11 Claims. (Cl. 37—67)

This invention relates to cutters employed in hydraulic dredging and particularly to that type of cutter used in cutting rock.

In hydraulic dredging practice the material to be dredged is cut away from the bank by means of a cutter which is rotated by a shaft supported by a ladder that is fastened to the dredge by a hinged connection so that it may be readily raised and lowered. This provides the means for bringing the cutter into the best position against the bank of material to be dredged to ensure efficient operation of the cutter. The type of cutter employed varies with the material to be dredged.

In the cutting of rock, during hydraulic dredging operations, it has been customary to employ a cutter in which the arms that extend from the nose or hub of the cutter to the ring at the rear thereof have therein sockets in which are placed teeth by which the material to be dredged is torn away from the bank. Those teeth are so arranged that during the rotation of the cutter they will be brought successively into contact with the rock that is to be broken and cut away.

In the operation of the cutter to effect such cutting away, the cutter is lowered into the rock while it is rotating, then the dredge is swung sidewise so as to press the cutter against one side of the depression that has just been cut in the rock. In the type of rock cutter heretofore used the arms were so warped from the nose of the cutter to the ring at the rear that, during the rotation of the cutter, the tooth nearest the nose, in a particular arm, was the first tooth to come into contact with the side of the wall in which the "cut" was to be made. Then, the second tooth from the nose of the cutter would be brought against the rock; and, thereafter, in succession, the third, fourth and fifth teeth would be brought against the face of the wall. It is apparent that with that type of cutter the first tooth to come in contact with the rock is at the location deepest in the rock at the point where the "cut" is being made. Obviously, the rock at the depth at which the first tooth of an arm comes in contact therewith is more tightly bound in by the surrounding mass of rock than is the rock at the outer face, where the rearmost tooth of the same arm (i. e., the tooth closest to the ring of the cutter) comes in contact with the said rock. This requires the use of more power and also results in rapid wearing away of the teeth of the cutter, which necessitates relatively frequent stoppages of operations and, cuts down the efficiency of the dredging operation.

By means of a cutter of the type in which the present invention is embodied, the efficiency of operations is greatly increased. This improved type of cutter is characterized in having the arms spiralled in such direction from the hub to the ring that the end of any particular arm, farthest away from the hub, is in advance, in the direction of rotation of the cutter, of the end of the same arm nearest the hub. That principle greatly facilitates the design of the cutter, particularly in that it permits the tooth sockets to be on the arms and each having its upper face parallel to the face of the arms without having a large flat face between the forward end of the socket and the arm; and also avoids the necessity for cutting the arm which is required when the spiral from the hub to the ring extends in the direction opposite to that mentioned above, both of which improvements eliminate undesirable features in previous designs that presented great obstructions in the cutting of rock.

Figure 2:
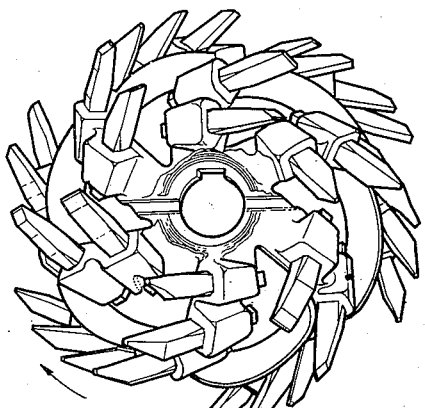
Figure 3:
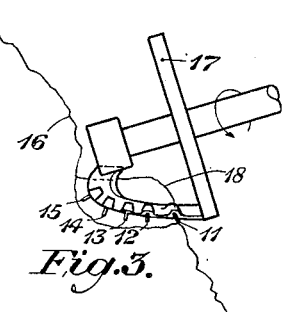
Figure 4:
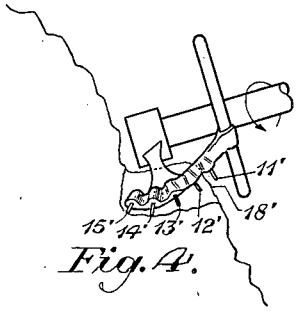
Figure 5:
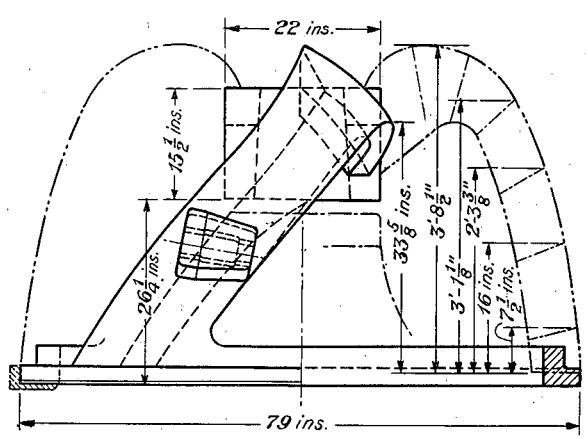

The manner in which those and other objects are obtained will be apparent from the following description when read in connection with the following drawing in which Figure 1 is an isometric view of the cutter embodying the present invention, the said cutter being shown as resting upon its ring; Fig. 2 is an isometric view of the cutter shown in Fig. 1, as seen from a point in front of the cutter; Fig. 3 is a schematic drawing of a cutter with a single arm to illustrate the principle of the cutter of Fig. 1 with a single arm; Fig. 4 likewise is a schematic drawing of a cutter with a single arm to show the principle of a prior art cutter; and Fig. 5 gives an idea of the size and proportions of the various parts of the cutter in which this invention is embodied.

The cutter shown in Fig. 1 includes a spider having a plurality of arms 1, 2, 3, etc., each of which extends from the hub 4 of the cutter to the back ring 5. Each of the said arms has formed therein, or attached thereto a plurality of sockets of which those designated 6, 7, 8, 9 and 10 of arm 2 are typical, and each socket is arranged to hold one of the teeth 11, 12, 13, 14 and 15. The arms of the spider, as shown in Fig. 1, extend from the hub to the ring and are warped or curved so that the teeth at the back of the cutter in any particular arm are in advance, in the direction of rotation (indicated by the arrow upon the drawing) of those upon the same arm and more forward, in the direction of the hub or nose of the cutter.

That direction of warping or curving the arms of the cutter is in striking contrast to the practice heretofore employed which is illustrated in Fig. 4. As will there be seen, the arms, extending from the hub to the ring are warped to the right so that the teeth near the ring, at the rear of the cutter, in any particular arm, are behind, in the direction of rotation of the cutter, those that are closer to the hub, and in the same arm. The direction of rotation of the cutter of Fig. 4 is the same as that of Fig. 3, as indicated by the arrows.

The fundamental difference in principle between the cutter, in which the present invention is embodied, and a cutter of the prior art is shown schematically by Figs. 3 and 4 in which, for the sake of simplicity, each cutter is represented as having a single arm. In Fig. 3, the bank, in which the cut is being made is designated 16, the bank being shown as one in which a cut has been started by the cutter 17. That cutter is of the type shown in Figs. 1 and 2, in which each arm is warped or curved, as it extends from the hub to the ring, so that the end of the arm at the point of connection to the ring is in advance of the point of connection of the same arm to the hub, in the direction of rotation of the cutter, which as indicated by the arrow around the shaft, is counter-clockwise when viewed from the rear of the cutter.

When that cutter is rotated the tooth 11 at the extreme rear end of the cutter will be the first tooth to strike the face of the rock, designated 18, in which the cut is being made. That point of contact is adjacent to the outer face of the wall of rock, which portion of rock obviously is more readily susceptible to being broken away than the portions further back, in a perpendicular direction from the face of the wall. After the first tooth has come in contact with the rock and has broken away the part in the immediate vicinity of the point of contact, the second tooth from the rear, designated 12 will then be brought against the rock at a point further back from the face of the rock than the point of contact of the first tooth therewith. Since, the first tooth has already shattered the rock adjacent to the face 18 of the wall, the rock in the vicinity of the point of contact of the tooth 12 will be less tightly bound, and hence the effectiveness of the pressure upon the rock, produced by the second tooth 12, will be greater than would have been the case if the portion of the rock nearer the face of the wall had not been previously shattered by the first tooth 11. In like manner, the rotation of the cutter brings into contact with the wall, the other teeth 13, 14 and 15 in succession.

The principle that underlies this improved type of rock cutter is to first cut away the portion of the rock nearest to the face of the wall, which portion is less tightly bound to the mass of rock than the portions deeper in the mass; then, upon the shattering of that portion, to proceed to shatter successive portions inwardly, i. e., relatively perpendicularly, from the face of the wall of rock. A cutter designed, with that principle in mind, is much more effective than the cutters of the prior art. The reason for that will be apparent from a comparison of the mode of operation of the cutter, embodying the present invention and a cutter of the prior art.

The principle of operation of the latter cutter is shown schematically in Fig. 4 in which a cutter having but a single arm is represented. Since that cutter also rotates in counter-clockwise direction (as viewed from the rear), and since the point of connection of each arm to the hub is more advanced, in the direction of rotation of the cutter, than the point of connection of the same arm to the ring, the teeth nearer the front of the cutter will be brought against the rock before those further back, i. e., those nearer to the ring will strike. Thus the first tooth to be brought in contact with the rock is that designated 15'. The point upon the rock, at which such contact is made, is the point farthest removed from the face of the wall in which the cut is being made. The portion of rock at that point of contact is obviously bound in tightly by the mass of rock surrounding it. Consequently, its resistance to being shattered by such a force is much greater than it would have been if such portion had been freed from the grip of the surrounding mass of rock. Accordingly, the effectiveness of the action of the first tooth 15' is much less than the effectiveness of the action of the first tooth 11 of the cutter shown in Fig. 3.

In similar fashion each of the teeth 14', 13', 12' and 11' of the cutter 17' of Fig. 4 are in numerical succession, brought in contact with the rock to be cut.

Furthermore, as a result of the resistance offered by the rock, and particularly the portion farthest removed from the face of the wall, the tooth closest to the hub is not infrequently worn to such an extent that the arm, supporting the tooth, rubs against the rock. This results in a wearing away of the arm and, at times, causes a breaking of the arm, so as to necessitate a replacement of the cutter. With a cutter of the type, in which the present invention is embodied, the efficiency of cutting rock of a given type is very much greater than is possible with any cutter of the prior art operating upon the same type of rock.

In the making of the new type of cutter, the pattern for the arm is made in the manner shown in Fig. 5. When the required number of arms are properly positioned around the hub and the ring and are fastened thereto, the sockets for the teeth are then placed across the face of the arms, the axis of each socket (excepting that at the extreme front end of the arm) being swung toward normal to the spiral of the arm at the place where the socket is located. The socket at the extreme front end of each arm is given a twist so that when the teeth are placed in such sockets there will be adequate clearance between their points so that they may function properly, not only in coming in contact with the rock at the best angle, but also to permit the flow of broken material through the space between the teeth.

The approximate positions of such sockets are indicated upon Fig. 5, but some readjustment may be necessary in order to attain the greatest efficiency, the degree of readjustment may be determined experimentally. In a preferred form of the cutter, two of the arms, which occupy correspondingly opposite positions upon the cutter have each six teeth, whereas the arms adjacent to each of the six tooth arms have five teeth, which teeth are staggered with respect to the six teeth upon the other arm. Fig. 5 also shows the relative size and proportions of the arms, the ring and the hub of a cutter and also indicates the approximate locations of the sockets to be formed upon the arms of the cutter and the variation from normal of the axis of the said sockets.

Although the invention has been shown as embodied in a particular form, it is capable of embodiment in other forms without departing from the spirit and scope of the appended claims.

What is claimed is:

1. A spider for a rock cutter for use in hydraulic dredging comprising a plurality of arms each curved so that the point of connection of an arm at the rear of the spider is in advance, in direction of rotation, of the point of connection at the nose of the cutter, a plurality of sockets attached to each arm, the sockets nearer the nose being so positioned that the front face of those sockets, in direction of rotation, is substantially parallel to that edge of the arm which is forward in direction of rotation.

2. A rock cutter for use in hydraulic dredging comprising a spider as defined in claim 1 in combination with a plurality of teeth, each inserted in one of the said sockets.

3. A rock cutter for hydraulic dredging comprising a hub near the front of the said cutter, a ring at the rear thereof, a plurality of arms extending from the hub to the ring and connected to both of said parts, each arm being so warped that its point of connection to said ring is in advance, in direction of rotation, of its point of connection to said hub, the said arms extending forwardly from the point of connection to said hub, then bending, to form the nose of the said cutter, and then extending rearwardly to the point of connection to said ring the said arms being adapted to support teeth thereon, the foremost teeth on each arm extending beyond the nose of the cutter to afford protection to the arms against abrasion.

4. A rock cutter for hydraulic dredging comprising, in combination, a hub near the nose of the said cutter into which a shaft may be fitted to rotate the said cutter, a ring at the rear of the said cutter, a plurality of arms extending from the said hub to the said ring, the said arms extending forwardly from their points of connection to the said hub, to form the nose of the said cutter, and then bending over and extending rearwardly to their points of connection to the said ring, the said arms being so warped that the point of connection of each arm to said ring is in advance, in the direction of rotation of the said cutter, of the point of connection of the same arm to the said hub and a plurality of teeth supported by the said arms, the foremost tooth on each arm extending beyond the nose of the cutter to afford protection to the arms against abrasion.

5. A rock cutter for hydraulic dredging comprising, in combination, a spider having a hub, a ring and a plurality of arms connected to said hub and said ring, the point of connection of an arm to the ring being in advance of the point of connection of the arm to the hub, in the direction of rotation of the said cutter, a plurality of sockets connected to each arm each adapted to hold a tooth, each of the sockets nearer the nose of the said cutter being so positioned upon their respective arms that the front face of those sockets is substantially in line with the forward edge of their respective arms whereby the tooth intended to be held thereby may be inserted in said socket without cutting away a portion of the arm.

6. A rock cutter for use in hydraulic dredging comprising, in combination, a hub at or near the nose of said cutter, a ring at the rear of said cutter, a plurality of arms attached to said hub and said ring and extending therebetween, the point of connection of each arm to said ring being in advance of the point of connection of the same arm to the said hub, in the direction of rotation of the said cutter, each arm having a plurality of sockets attached to it and each socket being adapted to firmly hold a tooth therein, the sockets near the nose having their front faces substantially parallel with the front edge of the arm upon which the said sockets are positioned.

7. A rock cutter of the type defined by claim 6 characterized in that the arms are warped to such a degree that the tooth placed in the foremost socket of an arm or of certain arms will project substantially beyond the hub of the said cutter to afford protection to said hub against abrasion.

8. A spider for a rock cutter for hydraulic dredging comprising a hub, a ring and a plurality of arms each warped so that the point of connection of an arm to the ring at the rear of the spider is in advance, in direction of rotation, of the point of connection to the hub of the spider, and a plurality of sockets integrally formed on each arm, the sockets nearer the hub being so positioned that the front face of each of those sockets is substantially in line with the forward edge of the arm in which the socket is formed.

9. A rock cutter for hydraulic dredging comprising a hub, a ring and a plurality of arms each warped so that the point of connection of an arm to the ring at the rear of the cutter is in advance, in direction of rotation, of the point of connection of that arm to the hub, and a plurality of sockets, having teeth therein, connected to the said arms, the warping of each arm being of such character that the sockets nearer the hub will hold their respective teeth at an acute angle to the axis of rotation of the cutter and at the same time the front faces of the said nearer sockets will be substantially in line with the forward edge of the arm to which the sockets are connected.

10. A rock cutter as defined in claim 9 further characterized by the positioning of the sockets nearer the ring to hold the teeth, placed therein, in a plane approximately normal to the axis of rotation of the cutter.

11. A rock cutter for hydraulic dredging comprising a hub near the front of the cutter, a ring at the rear thereof, a plurality of arms extending from the hub to the ring and connected to both of those parts, each arm being so warped that its point of connection to the said ring is in advance, in direction of rotation, of its point of connection to the said hub, the said arms extending forwardly from the point of connection to the hub, then bending to form the nose of the said cutter, then extending rearwardly to the point of connection to the said ring, the said cutter being further characterized in that each arm has connected thereto a plurality of sockets, each adapted to hold a tooth, the sockets upon each arm nearer the nose being so positioned that the front face of each socket is substantially parallel to the forward edge of the arm, in the direction of rotation of the cutter.

LAURENCE T. GAYLORD.